(12) United States Patent
Edgar

(10) Patent No.: US 10,283,790 B2
(45) Date of Patent: May 7, 2019

(54) FUEL SOURCE, FUEL CELL SYSTEM AND ASSOCIATED METHOD

(71) Applicant: Intelligent Energy Limited, Loughborough (GB)

(72) Inventor: David Edgar, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 383 days.

(21) Appl. No.: 15/116,799

(22) PCT Filed: Feb. 11, 2015

(86) PCT No.: PCT/GB2015/050370
§ 371 (c)(1),
(2) Date: Aug. 4, 2016

(87) PCT Pub. No.: WO2015/121636
PCT Pub. Date: Aug. 20, 2015

(65) Prior Publication Data
US 2016/0351927 A1     Dec. 1, 2016

(30) Foreign Application Priority Data

Feb. 12, 2014  (GB) .................................. 1402442.6

(51) Int. Cl.
*H01M 8/04* (2016.01)
*G01R 27/00* (2006.01)
(Continued)

(52) U.S. Cl.
CPC ... *H01M 8/04656* (2013.01); *H01M 8/04208* (2013.01); *H01M 8/04559* (2013.01);
(Continued)

(58) Field of Classification Search
CPC ......... H01M 8/04208; H01M 8/04656; H01M 8/04992; H01M 8/04619; H01M 8/04589;
(Continued)

(56) References Cited

U.S. PATENT DOCUMENTS 6,995,550 B2 * 2/2006 Jacobson ............... B41J 3/4076
324/71.1
9,874,469 B2  1/2018 Bacot et al.
(Continued)

FOREIGN PATENT DOCUMENTS

CN     101197450 A    6/2008
CN     102597720 A    7/2012
(Continued)

OTHER PUBLICATIONS

International Search Report and Written Opinion dated May 6, 2015, in International Application No. PCT/GB2015/050370.

*Primary Examiner* — Anthony R Jimenez
*Assistant Examiner* — Paul D Baillargeon
(74) *Attorney, Agent, or Firm* — BakerHostetler

(57) ABSTRACT

A fuel source (100), a fluid gauge adapter (300), a fuel cell system (200) and an associated method. The fuel source (100) has a gauge (104) comprising an electronic multi-stable display (106). The fuel cell system (200) and method relate to receiving fuel from the fuel source (100), determining (212) a fuel consumption of the fuel cell system (200), calculating (214) a substance level of the fuel source in accordance with the fuel consumption and updating (216) an electronic multi-stable display of the fluid gauge of the fuel source in accordance with the substance level.

16 Claims, 2 Drawing Sheets

(51) Int. Cl.
  *G01F 23/00* (2006.01)
  *H01M 8/04537* (2016.01)
  *H01M 8/04082* (2016.01)
  *H01M 8/04992* (2016.01)

(52) U.S. Cl.
  CPC ... *H01M 8/04589* (2013.01); *H01M 8/04619* (2013.01); *H01M 8/04992* (2013.01); *Y02E 60/36* (2013.01)

(58) Field of Classification Search
  CPC .... H01M 8/04559; Y02E 60/36; G01F 23/00; G01F 22/00
  USPC ......................................................... 324/71.1
  See application file for complete search history.

(56) References Cited

U.S. PATENT DOCUMENTS

| | | |
|---|---|---|
| 2005/0162122 A1 | 7/2005 | Dunn et al. |
| 2006/0019135 A1 | 1/2006 | Curello |
| 2012/0226451 A1 | 9/2012 | Bacot et al. |
| 2013/0162439 A1 | 6/2013 | Schumacher |

FOREIGN PATENT DOCUMENTS

| | | |
|---|---|---|
| JP | 2004-226790 A | 8/2004 |
| JP | 2007-524201 A | 8/2007 |
| JP | 2007-305535 A | 11/2007 |
| JP | 2009-135077 A | 6/2009 |
| JP | 2010105252 | 5/2010 |
| JP | 2013-510327 A | 3/2013 |

\* cited by examiner

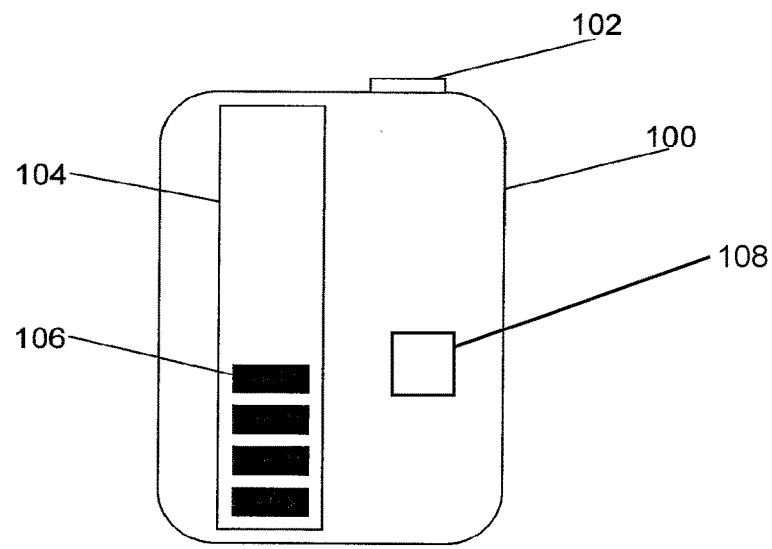
Figure 1
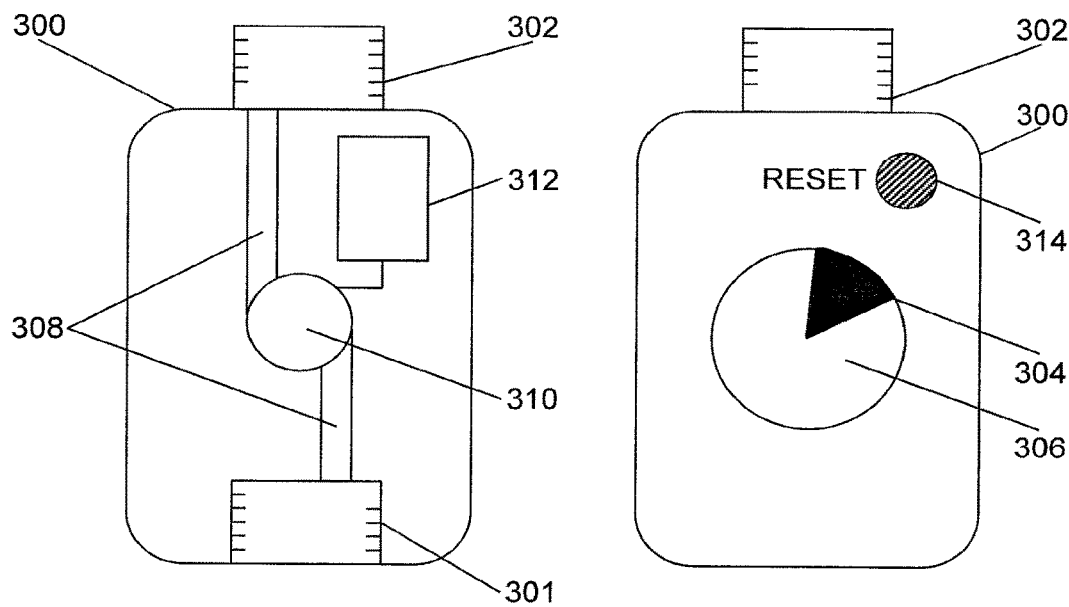
Figure 3a                    Figure 3b

FUEL SOURCE, FUEL CELL SYSTEM AND ASSOCIATED METHOD

CROSS-REFERENCE TO RELATED APPLICATIONS

This patent application is a U.S. National Stage Patent Application of International Patent Application PCT/GB2015/050370 filed Feb. 11, 2015, which claims priority to Great Britain Patent Application GB 1402442.6 filed Feb. 12, 2014, the disclosures of which are incorporated by reference in their entirety.

The disclosure relates to a fuel source or a fluid gauge adapter that comprises an electronic multi-stable display, such as an electrophoretic ink display.

Some conventional fuel cell systems utilise a fuel source such as a fuel reactor, which stores a solid reactant and a liquid reactant and, when fuel is required, mixes the reactants to generate hydrogen gas. The hydrogen gas is then supplied to the fuel cell system as fuel.

A mechanical arrangement can be provided in addition to a fuel reactor in order to display the amount of reactant that remains. A disadvantage of providing such a mechanical arrangement is that it typically requires the provision of moving parts and, possibly, calibration, both of which can increase the complexity of the design and manufacture of the fuel reactor.

Alternatively, when in use the fuel cell system can estimate its fuel consumption and so the amount of fuel left in the fuel source may be calculated and displayed. However, in such a scheme it would be necessary to store the remaining fuel level in a memory device on the fuel cartridge in order that the fuel level is known to the system when a fuel source is connected to the fuel cell system. In addition, it is not possible to display the fuel level remaining when the fuel source is not connected to a fuel cell device.

According to first aspect of the present invention there is provided a fuel source for a fuel cell system, the fuel source having a gauge comprising an electronic multi-stable display.

A fuel source according to the first aspect can provide an indication of the fuel available from the replaceable fuel source without the need for a power source. The fuel level may therefore be displayed when the fuel source is disconnected from the fuel cell stack. However, such a gauge may not require any moving parts and so can provide a gauge that is easier to manufacture and more reliable. In addition, because an electronic multi-stable display does not consume power when in a stable state, the power consumption of the gauge is lower than it be using other display technology.

The electronic multi-stable display may comprise an electronic paper display. The electronic paper display may comprise an electrophoretic ink. The fuel source may comprise a read-back unit. The read-back unit may be configured to determine a substance level of the fuel source by measuring an electrical property of the electronic multi-stable display. The electrical property may relate to one or more picture elements of the electronic multi-stable display. The electrical property may be a resistance or a capacitance of the electronic multi-stable display. In this way, a substance level (or reactant level) can be stored in the display when the fuel source is not in use rendering a memory device to store the level redundant.

According to a further aspect of the invention there is provided a fuel cell system configured to receive fuel from a fuel source and comprising a controller configured to:
determine a fuel consumption of the fuel cell system;
calculate a substance level of the fuel source in accordance with the fuel consumption; and
update an electronic multi-stable display of the fluid gauge of the fuel source in accordance with the substance level.

The fuel cell system can be used in combination with the fuel source of the first aspect.

The controller may be configured to receive a substance level from the electronic multi-stable display. The controller may be configured to calculate a subsequent substance level of the fluid storage device in accordance with the fuel consumption and the read substance level. The substance level of the display may comprise measuring an electrical property of one or more picture elements of the display. The controller may be configured to determine the fuel consumption in accordance with an output voltage, current or power of the fuel cell system.

The fuel cell system may comprise a flow meter, which may be provided on a fuel inlet line. The controller may be configured to determine the fuel consumption in accordance with the metered flow.

According to further aspect of the invention there is provided a method and computer program for operating a fuel cell system comprising:
receiving fuel from a fuel source;
determining a fuel consumption of the fuel cell system;
calculating a substance level of the fuel source in accordance with the fuel consumption; and
updating an electronic multi-stable display of the fluid gauge of the fuel source in accordance with the substance level.

According to further aspect of the invention there is provided a fluid gauge adapter comprising:
a fluid gauge comprising an electronic multi-stable display;
a flow path between an inlet and an outlet of the adapter;
a fluid property measuring device configured to measure a property of a fluid in the flow path; and
a controller configured to:
calculate a fluid level of a fluid storage device in accordance with the property of the fluid; and
update the electronic multi-stable display of the fluid gauge in accordance with the fluid level.

The provision of such a fluid gauge adapter enables an electronic multi-stable display to be provided with a conventional fuel source and so provide the advantages of improved ease of manufacture, reduced power consumption and greater utility described with reference to the first aspect of the invention.

The controller may periodically update the display. The fluid gauge adapter may comprise a generator configured to generate power using fluid flow through the flow path. The fluid gauge adapter may comprise a renewable energy source.

According to a further aspect of the invention, we provide a substance storage vessel, the vessel having a gauge comprising an electronic multi-stable display, the vessel including a read-back unit configured to provide for determination of a substance level in the vessel by measurement of an electrical property of the electronic multi-stable display.

This is advantageous as the substance storage vessel does not require a separate memory and display as it is able to use the electronic multi-stable display to store the level of the consumable substance in the vessel. The read-back unit may be configured such that the vessel is able to read the display and provide the information to a further system. Alternatively, the read-back unit may comprise sensor connections that allows a system to which the substance storage vessel connects, such a system than consumes the substance therein, to measure the electrical property of the display. The substance may be a fuel or any other consumable.

According to a further aspect of the invention we provide a system configured to receive a substance from a substance storage vessel, the vessel having a gauge comprising an electronic multi-stable display, the system configured to determine a substance level in the vessel by measurement of an electrical property of the electronic multi-stable display.

This is advantageous as the system is able to use the multi-stable display to directly derive the substance level.

According to a further aspect of the invention we provide a method of determining a substance level of a substance in a storage vessel, the storage vessel comprising an electronic multi-stable display configured to display the substance level, the method comprising;

measuring an electrical property of the electronic multi-stable display and deriving the substance level therefrom.

The method may include the step of determining the amount of substance consumed from the storage vessel and updating the electronic multi-stable display with an updated substance level.

The invention will now be described with reference to the accompanying figures, in which:

FIG. 1 illustrates a schematic diagram of a fuel source for a fuel cell system;

FIG. 2b illustrates a method for operating the fuel cell system of FIG. 2a;

FIG. 3a illustrates a schematic diagram of an interior of a fluid gauge adapter; and FIG. 3b illustrates a schematic diagram of an exterior of a fluid gauge adapter.

Figure 2A:
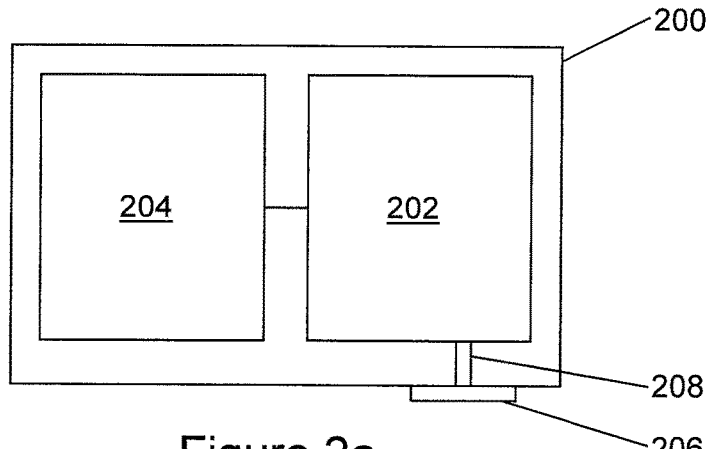
FIG. 2a illustrates a fuel cell system configured to receive fuel from, and update a gauge of, a fuel source such as that shown in FIG. 1.

FIG. 1 illustrates a fuel source 100 for a fuel cell system. The fuel source 100, which is typically provided as a fuel reactor, may store a solid reactant and a fluid reactant (a liquid and/or gas) and mix the reactants to generate hydrogen fuel which is then supplied through the outlet 102. Such a fuel source is an example of a fluid storage device.

The fuel source has a gauge 104 comprising an electronic multi-stable display 106 that in this example displays the remaining reactant level in the fuel source. The gauge shown takes 104 the form of a bar chart, but it will be appreciated that any suitable representation may be used.

The electronic multi-stable display 106 is capable of maintaining one of a plurality of stable states without the consumption of power. That is, the multi-stable display has a plurality of passive display states. The display will maintain its state for a duration or several months, or possibly several years, when in storage or not in use. Power is, however, consumed in order to alter the state of a picture element of the display. Multi-stable displays are sometimes described in the art as electronic paper displays and are used in the Amazon Kindle® e-reader, for example. Electrophoretic ink displays are a class of electronic paper display that provide suitable contrast and power consumption characteristics for the gauge 104. The background to such displays can be provided by a reflective medium and so a backlight is not required for many applications. Such a display is therefore considered to be daylight-readable. A coloured filter may be provided on the screen if desired.

A fuel cell system can update the gauge when the fuel cell is in use, as will be discussed further with reference to the fuel cell system and associated method of FIGS. 2a and 2b, below.

Even when it is not connected to a fuel cell system, that is when no power is available, the amount of remaining fuel output capacity can be displayed on the fuel source 100 because the gauge 104 is provided by an electronic multi-stable display 106. By providing an electronic multi-stable display 106 on the fuel cartridge 100 it is possible to separate the control circuitry from the display circuitry; a controller may be provided as part of a fuel cell system (rather than as part of the fuel source) and shared between many fuel sources. Each fuel source only requires access to the controller when it is engaged with the fuel cell system and providing fuel. As such, the combined component count of a system and fuel sources can be reduced with the effect that it may be easier and cheaper to manufacture the fuel sources.

The fuel source 100 may be provided with a read-back unit (not shown) that is configured to determine a substance level (or reactant level) of the fuel source by measuring an electrical property of the electronic multi-stable display. For example, the capacitance or resistance of a picture element can be related to its colour or grey-scale value. Measuring a combination of capacitance and resistance, in response to a small electrical signal from the read back unit, enables the substance level stored in each pixel to be determined. Therefore, by measuring an electrical property or properties of some or all of the individual picture elements of the display 106, the read back unit can determine what the state of the fuel gauge was when the device was last powered-up. In this way, the substance level can be stored in the display when the fuel source is not in use, rather than in a unit of memory. The read-back unit may be interrogated by a fuel cell system when the fuel source 100 is plugged into it. In this way, the fuel cell system can determine how much fuel may be extracted from the fuel source without needing to either keep track of a historical state of the fuel source 100 in the fuel cell system or store a historical state of the fuel source 100 in a memory module on the fuel source 100.

FIG. 2a illustrates a fuel cell system 200 comprising fuel cell components 202 and a controller 204. The fuel cell system 200 is configured to receive fuel from a removable or replaceable fuel source, such as the fuel source described above with reference to FIG. 1. A port 206 of the fuel cell system 200 may be configured to engage with the outlet of the fuel source in a conventional manner.

The controller 204 is configured to perform the method described with reference to FIG. 2b. The controller 204 may be provided, at least in part, by a computer program. When the fuel source is first plugged in, the controller can perform the optional step of receiving 210 a substance level from an electronic multi-stable display of the fuel source. In the case where the fuel source is a fuel reactor, as in the example of FIG. 1, the substance level may be the level of a reactant remaining in the fuel source. Alternatively, where the fuel source is a canister, or tank, the substance level may be the level of fuel remaining.

When the fuel source is connected to the fuel cell system 200, the state of the electronic multi-stable display is indicative of the substance level because the state of the display is the same as when it was last set by a previously connected fuel cell system. The controller may receive 210 the substance level from a read-back unit of the fuel source as described in FIG. 1. Alternatively, the controller may itself perform the function of the read-back unit and receive 210 the substance level by measuring an electrical property or properties of one or more picture elements of the display.

The method further comprises the step of determining 212 a fuel consumption of the fuel cell system 200. The determination 212 may be performed in accordance with an output voltage, current or power of the fuel cell system, as is known in the art. Alternatively, the fuel consumption may be determined 212 in accordance with fuel flow from the fuel source or within the fuel cell system 200. The fuel flow can be measured using a flow meter (not shown) on a fuel inlet line 208 connected to the fuel port 206.

A substance level of the fuel source is then calculated 214 in accordance with the fuel consumption. For example, the controller 204 may deduct an integral of the fluid consumption over time from a historical substance level held in memory. In the case where the fuel cell system 200 receives the substance level from the display, the controller 204 may calculate 214 a subsequent substance level of the fuel source in accordance with the fuel consumption and the read substance level.

Figure 2B:
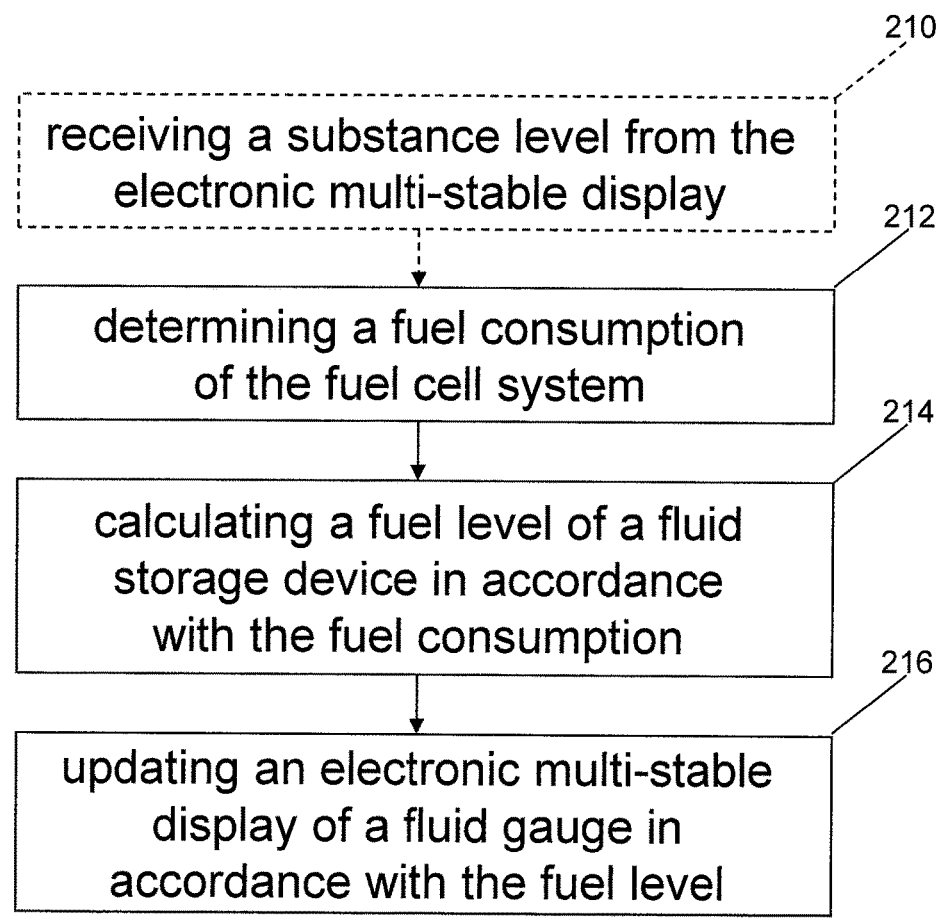

The final step of the method of FIG. 2b relates to updating 216 the electronic multi-stable display of the fuel source in accordance with the substance level. The update may be sent via a connection, a serial link for example, through the port 206 that is engaged with the fuel source. The updating step 216 may comprise instructing display driving hardware for the multi-stable display. Alternatively the fuel cell system may comprise the display driving hardware and send signals directly to the display.

FIGS. 3a and 3b illustrate schematic representations of an interior and an exterior, respectively, of a fluid gauge adapter 300. The fluid gauge adapter 300 has an inlet 301 and an outlet 302. The adapter 300 comprises a fluid gauge 304 comprising an electronic multi-stable display 306. The inlet 201 of the adapter 300 may therefore be affixed to a fluid storage device, such as a fuel source or a fluid cylinder, in order to provide fluid gauge functionality to the fluid storage device.

As can be seen in the interior view of FIG. 3a, the adapter 300 has a flow path 308 between the inlet 301 and the outlet 302 and a fluid property measuring device 310 configured to measure a property of a fluid in the flow path. The property of the fluid may be a pressure of the fluid, for example, in which case fluid property measuring device 310 may be a barometer. Alternatively, the property of the fluid may be the rate of flow of the fluid in which case fluid property measuring device 310 may be a flow meter.

A generator may be provided in the flow path 308 that is configured to generate power using the fluid flow through the flow path 308. In some examples the fluid property measuring device 310 and the generator may be provided by a unitary device. In such examples, the level of power, voltage or current output may be indicative of the fluid flow through the flow path 308.

The fluid gauge adapter 300 can also comprise a renewable energy source (not shown) in addition to or as an alternative to the generator. Solar panels and wind turbines are examples of renewable power sources. More broadly, the term renewable power source may encompass any power source that may be renewed, such as battery power.

A controller 312 is provided within the fluid gauge adapter 300. The controller is configured to perform a method that is similar to the method of FIG. 2b (although). That is, the controller 312 is configured to receive a property of the fluid from the fluid property measuring device 310, determine a fluid flow rate from the property and calculate, in accordance with the fluid flow rate, a fluid level of the fluid storage device connected to the inlet. The controller 312 then updates the electronic multi-stable display 306 of the fluid gauge 304 in accordance with the fluid level.

A switch 314 is provided on the exterior of the fluid gauge adapter 300 to allow user input to be provided. The user input can be indicative of the fluid gauge adapter 300 being connected to a full fluid storage device. The controller is configured to receive the user input from the switch and so can set the electronic multi-stable display 306 to display a full gauge indication when the user input is received. In this example, the gauge 304 takes the form of a pie chart, but it will be appreciated that any suitable representation may be used.

By measuring the property of the fluid when the user input is received, the controller 212 can set a full level property of the fluid. The controller 312 subsequently compares the property of the fluid received from the fluid property measuring device 310 with the full level property in order to determine the proportion of fluid remaining in the fluid storage device. The controller can be configured to update the display periodically, rather than constantly. Periodic operation of the controller can reduce the power consumption of the controller and so limit the demands on the generator or renewable fuel source.

It will be appreciated that a feature described in regard to one example may be described in relation to another embodiment. While the embodiments described herein relate to a fuel reactor that stores fuel for a fuel cell system, any substance storage vessel storing any substance may be provided with such a multi-stable display. Thus, the multi-stable display or storage vessel may include a read-back unit that enables the display itself to be read by the storage vessel or a system to which the vessel connects. Accordingly, the amount of substance taken from or added to the vessel may be determined by the system and subtracted from or added to the substance level read from the display. The multi-stable display can then by updated to display and therefore store the updated substance level. The vessel may then be disconnected from the system while retaining and displaying its substance level.

The invention claimed is:

1. A fuel source for a fuel cell system, the fuel source having a fuel gauge comprising an electronic multi-stable display and a read-back unit configured to determine a first substance level of the fuel source by measuring an electrical property of the electronic multi-stable display.

2. The fuel source of claim 1 wherein the electronic multi-stable display comprises an electronic paper display.

3. The fuel source of claim 2 wherein the electronic paper display comprises electrophoretic ink.

4. A fuel cell system comprising:
the fuel source of claim 1;
a controller configured to:
determine a fuel consumption of the fuel cell system;
calculate a second substance level of the fuel source in accordance with the fuel consumption; and,
update the electronic multi-stable display of the fluid gauge of the fuel source in accordance with the second substance level.

5. The fuel cell system of claim 4 wherein; the controller is configured to
receive a second substance level from the read-back unit; and,
calculate a third substance level of the fuel source in accordance with the fuel consumption and the second substance level.

6. The fuel cell system of claim 5 wherein receiving the second or third substance level comprises measuring an electrical property of one or more picture elements.

7. The fuel cell system of claim 4 wherein the controller is configured to determine the fuel consumption in accordance with an output voltage, current or power of the fuel cell system.

8. The fuel cell system of claim 4 further comprising a flow meter on a fuel inlet line and wherein the controller is configured to determine the fuel consumption in accordance with a flow through the flow meter.

9. A method for operating a fuel cell system, the method comprising:
   receiving fuel from a fuel source having a fuel gauge comprising an electronic multi-stable display;
   determining a first substance level of the fuel source by way of measurement of an electrical property of the electronic multi-stable display;
   determining a fuel consumption of the fuel cell system;
   calculating a second substance level of the fuel source in accordance with the fuel consumption; and,
   updating the electronic multi-stable display of the fluid gauge of the fuel source in accordance with the second substance level.

10. A non-transient computer program on a computer readable medium configured to perform the method of claim 9.

11. A fluid gauge adapter comprising:
   a fluid gauge comprising an electronic multi-stable display;
   a flow path between an inlet and an outlet of the adapter;
   a fluid property measuring device configured to measure a property of a fluid in the flow path; and,
   a controller configured to:
      determine a substance level of a fluid storage device by way of measurement of an electrical property of the electronic multi-stable display;
      calculate a subsequent fluid level of the fluid storage device in accordance with the property of the fluid; and,
      update the electronic multi-stable display of the fluid gauge in accordance with the subsequent fluid level.

12. The fluid gauge adapter of claim 11 wherein the controller periodically updates the display.

13. The fluid gauge adapter of claim 11 further comprising a generator configured to generate power using a fluid flow through the flow path.

14. A substance storage vessel, the vessel having a gauge comprising an electronic multi-stable display, the vessel including a read-back unit configured to provide for determination of a substance level in the vessel by measurement of an electrical property of the electronic multi-stable display.

15. A system configured to receive a substance from a substance storage vessel, the vessel having a gauge comprising an electronic multi-stable display, the system configured to determine a substance level in the vessel by measurement of an electrical property of the electronic multi-stable display.

16. A method of determining a substance level of a substance in a storage vessel, the storage vessel comprising an electronic multi-stable display configured to display the substance level, the method comprising
   measuring an electrical property of the electronic multi-stable display and deriving the substance level therefrom.

* * * * *